United States Patent
Arai et al.

(10) Patent No.: US 7,107,678 B2
(45) Date of Patent: *Sep. 19, 2006

(54) FORMING METHOD OF THROTTLE APPARATUS FOR INTERNAL COMBUSTION ENGINE

(75) Inventors: Tsuyoshi Arai, Kariya (JP); Naoki Hiraiwa, Toyokawa (JP); Masami Goto, Kasugai (JP); Katsuya Torii, Anjo (JP)

(73) Assignee: Denso Corporation, (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/983,260

(22) Filed: Nov. 8, 2004

(65) Prior Publication Data

US 2005/0120556 A1    Jun. 9, 2005

(30) Foreign Application Priority Data

Nov. 7, 2003    (JP) ............................ 2003-379089

(51) Int. Cl.
 *B21K 1/22* (2006.01)
 *B21K 1/20* (2006.01)
 *B29C 45/00* (2006.01)

(52) U.S. Cl. ............... 29/888.4; 29/888.45; 29/888.46; 29/527.1; 264/242; 264/328.8; 264/334; 425/573

(58) Field of Classification Search ............... 29/888.4, 29/888.45, 888.46, 527.1; 264/242, 328.8, 264/328.18, 334, 275; 425/812, 573
See application file for complete search history.

(56) References Cited

U.S. PATENT DOCUMENTS

| | | | | |
|---|---|---|---|---|
| 3,675,888 | A | * | 7/1972 | Scaramucci .................. 249/57 |
| 4,995,445 | A | * | 2/1991 | Shigyo ....................... 164/305 |
| 5,304,336 | A | | 4/1994 | Karlsson et al. |
| 5,794,591 | A | * | 8/1998 | Kalebjian et al. ........... 123/337 |
| 5,919,492 | A | * | 7/1999 | Tarr et al. .................... 425/144 |
| 6,138,988 | A | * | 10/2000 | Bouvet et al. ............... 251/306 |
| 2005/0022365 | A1 | | 2/2005 | Arai et al. |
| 2005/0022781 | A1 | | 2/2005 | Arai et al. |
| 2005/0022786 | A1 | | 2/2005 | Arai et al. |
| 2005/0022787 | A1 | | 2/2005 | Arai et al. |
| 2005/0097743 | A1 | | 5/2005 | Arai et al. |
| 2005/0097744 | A1 | | 5/2005 | Arai et al. |
| 2005/0097745 | A1 | | 5/2005 | Arai et al. |

FOREIGN PATENT DOCUMENTS

| DE | 101 05 526 A1 | 8/2002 |
|---|---|---|
| JP | 2000-202866 | 7/2000 |

* cited by examiner

*Primary Examiner*—David P. Bryant
*Assistant Examiner*—Sarang Afzali
(74) *Attorney, Agent, or Firm*—Nixon & Vanderhye PC

(57) ABSTRACT

A throttle valve and the throttle body are formed substantially simultaneously in the same dies. The melted resin is injected in to a cavity through a pair of valve gates. The valve gates are symmetrically located with respect to the throttle valve shaft. A deformation of the throttle valve can be avoided because a stress concentration on the metal shaft of the throttle valve is reduced in opening the dies.

7 Claims, 10 Drawing Sheets

FORMING METHOD OF THROTTLE APPARATUS FOR INTERNAL COMBUSTION ENGINE

CROSS REFERENCE TO RELATED APPLICATION

This application is based on Japanese Patent Application No. 2003-379089 filed on Nov. 7, 2003, the disclosure of which is incorporated herein by reference.

FIELD OF THE INVENTION

The present invention relates to a forming method of a throttle apparatus for an internal combustion engine mounted in a vehicle. Especially, the present invention relates to an injection molding method of a throttle apparatus, in which a throttle valve and a throttle body are substantially simultaneously formed in the same dies.

BACKGROUND OF THE INVENTION

In an electrically controlled throttle apparatus shown in FIG. 11, a driving device such as a motor controls an opening degree of a throttle valve 102 in accordance with a position of an accelerator pedal stepped by a driver. In the throttle apparatus, a gap is formed between an inner periphery of a substantially tubular throttle body 101 and an outer circumferential periphery of a throttle valve 102, and the gap has a large influence of an air tightness of the throttle apparatus when the throttle valve 102 is in its full close position.

Conventionally, the throttle body 101 and the throttle valve 102 are independently manufactured in each different process. Subsequently, a manufactured throttle valve 102 is combined with a manufactured throttle body 101 in accordance with an inner peripheral dimension of the manufactured throttle body 101 in a downstream process. Alternatively, a manufactured throttle body 101 is combined with a manufactured throttle valve 102 in accordance with an outer circumferential dimension of the throttle valve 102 in a downstream process. Thus, a predetermined gap is obtained between the bore inner periphery of the throttle body 101 and the outer circumferential periphery of a throttle valve 102. A throttle shaft 103 integrally rotates with the throttle valve 102. Both of the ends of the throttle shaft 103 are rotatably supported by cylindrical bearings 104 provided in the throttle body 101.

U.S. Pat. No. 5,304,336, which is a counterpart of JP-5-141540A, shows molding methods in which a manufacturing process of the throttle body and the throttle valve is reduced. In the molding methods, the throttle body 101 and the throttle valve 102 shown in FIG. 12 are integrally molded of a resinous material in the same molding dies. At first, the substantially tubular throttle body 101 is integrally molded of a resinous material. Subsequently, inner periphery (bore inner periphery) of the throttle body 101 is used as a part of a molding die molding the throttle valve 102, and the throttle valve 102 is molded. Thus, a shape of an outer circumferential periphery of the throttle valve 102 is adapted to a shape of the bore inner periphery of the throttle body 101 in the above molding methods.

The molded throttle body 101 is gradually cooled in the body cavity to be solidified. Subsequently, the movable die is slid forward in order to form a valve cavity, into which a resinous material is filled. The throttle valve 102 is molded of a resinous material in the throttle body 101.

However, in the above molding methods of the throttle valve 102, the throttle body 101 is molded of a resinous material while the molded throttle body 101 is restricted by dies in its radial direction and in its substantially circumferential direction. Thus, the throttle valve 102 is molded of a resinous material while the throttle body 101 and the throttle valve 102 are restricted by the dies. The throttle body 101 and the throttle valve 102 are taken out of the dies, and gradually cooled. In this cooling period, the unrestricted throttle body 101 and the throttle valve 102 are contracted. The throttle body 101 and the throttle valve 102 are deformed. Accordingly, it is difficult to maintain the gap in a predetermined dimension between the inner periphery of the throttle body 101 and the outer circumferential periphery of the throttle valve 102.

A practical use of the throttle apparatus releases an internal stress, by which the apparatus is deformed. When the throttle apparatus is made from a crystal resin and is crystallized, the apparatus is deformed due to the crystallization thereof. Even the apparatus is annealed or aged, the throttle body 101 and the throttle valve 102 are deformed individually, To solve the above problem, the inventors filed Japanese patent application No. 2003-285434 on Aug. 1, 2003. In this application, the throttle valve and throttle body is formed in a same die in such a manner that the throttle valve is opened in a predetermined angle. However, as shown in FIGS. 13, and 14A, when a valve gate through which a melted resin is injected into cavity is located at an outer periphery of the throttle valve 102, the throttle shaft (a metal shaft) 103 is deformed by an injection pressure of the resin as shown in FIG. 14B. In FIGS. 13, 14A, 14B, a direction of resin injection is represented by an arrow. When a valve gate is located at the throttle shaft 103 and a melted resin is injected in a direction which is perpendicular to a radius direction of the throttle valve 102 as represented by an arrow, the throttle shaft (the metal shaft) 103 is deformed as shown in FIG. 16B.

As mentioned above, when the melted resin is injected into the cavity from the valve gate located at the non-symmetry position with respective to the throttle shaft 103, the throttle valve 102 cannot rotate smoothly in the throttle body 101. Alternatively, the circularity of the throttle valve 102 is deteriorated. Thus, when the throttle valve 102 closes the throttle body 101, a clearance between the inner surface of the throttle body 101 and the outer surface of the throttle valve 102 becomes large to increase an air leakage therebetween.

SUMMARY OF THE INVENTION

An object of the present invention is to provide a forming method of the throttle apparatus in which a predetermined gap is maintained between the inner periphery of the throttle body and the outer periphery of the throttle valve, and in which the deformation of the throttle valve is avoided.

According to the present invention, a forming method of a throttle apparatus for an internal combustion engine is conducted as follows.

At first, clamping a pair of molding dies to form a body cavity and a valve cavity therein, the body cavity being for molding a throttle body and the valve cavity being for molding a throttle valve. Next, injecting a melted material into the body cavity and the valve cavity is carried out. Next, moving a die away from the other die in order to eject a solidified molding is carried out.

The melted material is injected into the body cavity and the valve cavity through a plurality of valve gates each of which are symmetrically located with respect to the axis.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

Figure 1:
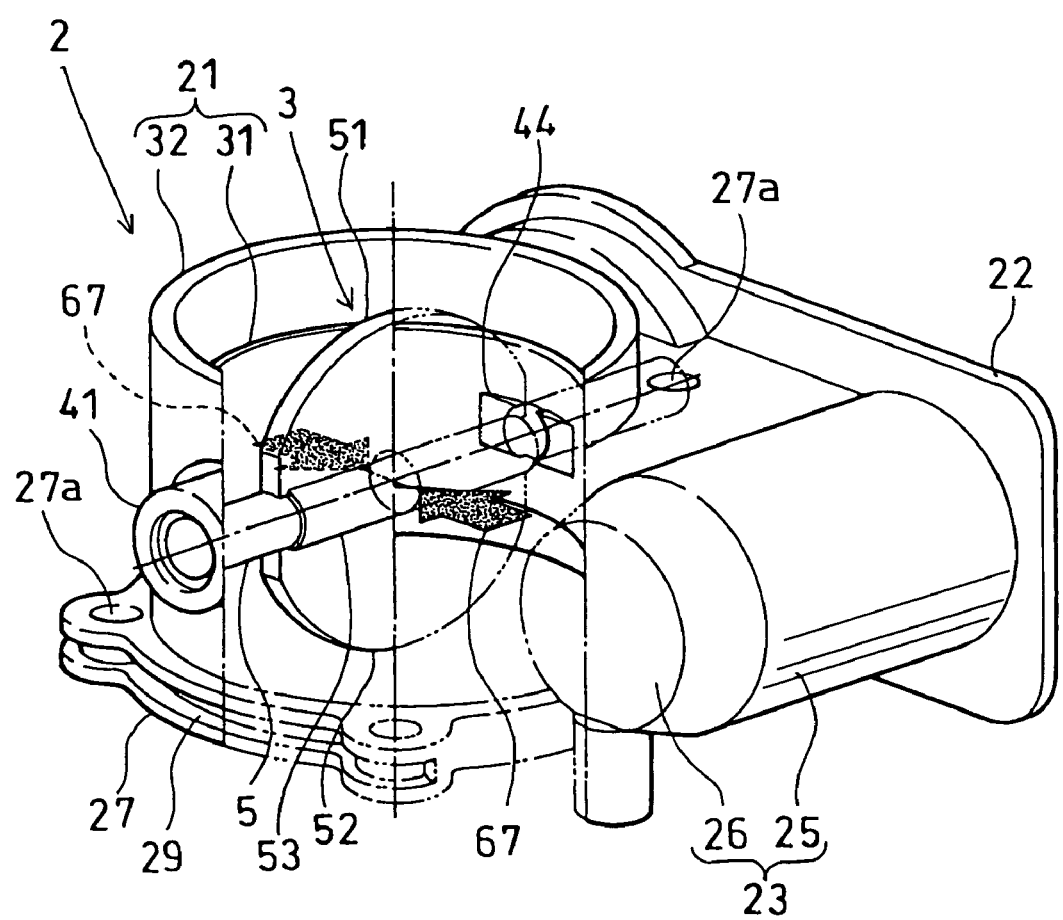
FIG. 1 is a perspective view of a throttle valve and a throttle body showing a position of valve gate according to a first embodiment of the present invention.

An embodiment of the present invention will be described hereinafter with reference to the drawings.

(First Embodiment)

As shown in FIGS. 1 to 8, a throttle control apparatus has a driving motor 1, a throttle body 2, a throttle valve 3, a coil spring 4, and an electronic control unit which is referred to as ECU hereinafter. The driving motor 1 functions as a power source. The throttle body 2 forms a part of intake passage communicated with each cylinder of an internal combustion engine. The throttle valve 3 controls an amount of intake air flowing into the engine through the throttle body 2. The coil spring 4 urges the throttle valve 3 in the close direction. The ECU electrically controls the opening degree of the throttle valve 3 according to an operation degree (accelerator operation amount) of an accelerator pedal stepped by a driver.

The ECU is electrically connected with an accelerator position sensor (not shown) which converts the accelerator operation amount into an accelerator position signal. The accelerator position signal represents the accelerator operation amount. The electrically controlled throttle apparatus has a throttle position sensor that converts an opening degree of the throttle valve 3 into an electronic signal (throttle position signal) in order to output the throttle position signal to the ECU. The throttle position signal represents an opening degree of the throttle valve 3. The ECU performs PID (proportional, integral and differential [derivative]) feedback control with respect to the driving motor 1 in order to eliminate deviation between the throttle position signal transmitted from the throttle position sensor and the accelerator position signal transmitted from the accelerator position sensor.

The throttle position sensor is constructed with permanent magnets 6, yokes (not shown), a Hall effect device (not shown), a terminal (not shown), a stator (not shown) and the like. The permanent magnets 6 are separated rectangular magnets used for generating a magnetic field. The yokes are constructed with separated substantially arc-shaped pieces, and are magnetized by the permanent magnets 6. The hall element is integrally provided with a sensor cover 7 to be opposed to the separated permanent magnets 6. The stator is made of a ferrous metallic material for concentrating magnetic flux into the hall element. The separated permanent magnets 6 and the separated yokes are secured to the inner periphery of a valve gear 8, which constructs the reduction gears, using glue or the like.

The sensor cover 7 is formed of a resinous material such as thermoplastic resin in a predetermined shape, in order to electrically insulate between terminals of the throttle position sensor and power-supply terminals of the driving motor 1. The sensor cover 7 has an engaging part that engages with a corresponding engaged part, which is formed on the opening side of the gearbox part 22 of the throttle body 2, each other. The engaging part of the sensor cover 7 and the engaged part of the gearbox part 22 are connected using a rivet, a screw (not shown), or are thermally swaged with each other. A cylindrical shaped receptacle 7a is integrally molded with the sensor cover 7 to be connected with an electrical connector (not shown).

A driving unit rotating the throttle valve 3 in the opening or closing direction includes the driving motor 1, and a reduction gear which transmits the driving force of the driving motor 1 to the throttle valve 3 through a metal shaft 5. The driving motor 1 is connected with terminals which are provided in the sensor cover 7. The driving motor 1 is fixed on the throttle body 2 with a screw 9.

The reduction gears reduce rotation speed of the driving motor 1 by a predetermined reduction gear ratio. The reduction gears (valve driving means, power transmission unit) is constructed with a pinion gear 11, a middle reduction gear 12 and the valve gear 8 for driving the metal shaft 5 that rotates the throttle valve 3. The pinion gear 11 is secured to the outer periphery of the motor shaft of the driving motor 1. The middle reduction gear 12 engages with the pinion gear 11 to be rotated by the pinion gear 11. The valve gear 8 engages with the middle reduction gear 12 to be rotated by the middle reduction gear 12.

The pinion gear 11 is made of a metallic material, and is integrally formed with the motor shaft of the driving motor 1 to be in a predetermined shape, so that the pinion gear 11 serves as a motor gear that integrally rotates with the motor shaft of the driving motor 1. The middle reduction gear 12 is formed to be in a predetermined shape of a resinous material, and is rotatably provided onto the outer periphery of the supporting shaft 14 that serves as a rotation center of the middle reduction gear 12. The middle reduction gear 12 is constructed with a large gear part 15, which engages with the pinion gear 11 of the motor shaft, and a small gear part 16 that engages with the valve gear 13. The supporting shaft 14 is integrally molded with the bottom wall of the gearbox part 22 of the throttle body 2. An end part of the supporting shaft 14 engages with a recess portion formed in the inner wall of the sensor cover 7.

The valve gear 8 is integrally molded to be in a predetermined substantially cylindrical shape of a resinous material. Gear teeth (teeth part) 17 are integrally formed in the outer periphery of the valve gear 8 to engage with the small gear part 16 of the middle reduction gear 12. The outer periphery of the cylindrical part (spring inner periphery guide) of the valve gear 8 supports the diametrically inner periphery of the coil spring 4. A full-close stopper portion 19 is integrally formed with the valve gear 8 on one end plane in the outer circumferential periphery of the valve gear 8, i.e., the gear teeth 17. The full-close stopper portion 19 hooks to the full-close stopper 13 of the gearbox part 22, when the throttle valve 3 is in the idling position, i.e., full close position.

The throttle body 2 is a throttle housing that includes the substantially cylindrical-shaped bore wall part 21 internally forming a circular-shaped intake passage, through which intake air flows into the engine. The bore wall part 21 internally receives the disc-shaped throttle valve 3, such that the throttle valve 3 can open and close the circular-shaped intake passage of the bore wall part 21. The bore wall part 21 rotatably receives the throttle valve 3 in the intake passage (bore), such that the throttle valve 3 can rotate from the full close position to the full open position. The throttle body 2 is screwed onto an intake manifold of the engine using a fasting bolt or a screw (not shown).

The bore wall part 21 of the throttle body 2 is formed in a predetermined shape that has a double-pipe structure, in which a substantially cylindrical-shaped bore outer pipe 32 is arranged on the diametrically outer side of a substantially cylindrical-shaped bore inner pipe 31. The bore inner pipe 31 is an internal side cylindrical part that forms an internal periphery. The bore outer pipe 32 is an external side cylindrical part that forms an outer member. The bore wall part 21 of the throttle body 2 is made of a thermo stable resinous material, such as PPS, PA, PP or PEI. The bore inner pipe 31 and the bore outer pipe 32 have an intake-air inlet part (air intake passage) and an intake-air outlet part (air intake passage). Intake air drawn from an air cleaner (not shown) passes through an intake pipe (not shown), the intake-air inlet part and the intake-air outlet part of the bore wall part 21. Subsequently, the intake air flows into a surge tank of the engine or the intake manifold. The bore inner pipe 31 and the bore outer pipe 32 are integrally molded with each other. The bore inner pipe 31 and the bore outer pipe 32 have a substantially the same inner diameter and a substantially the same outer diameter along with the intake airflow direction, i.e., the direction from the upper side to the lower side in the vertical direction of FIG. 1.

The bore inner pipe 31 internally has an air intake passage, through which intake air flows to the engine. The throttle valve 3 and the metal shaft 5 are rotatably provided in the air intake passage of the bore inner pipe 31. A cylindrical space (annular space) is formed between the bore inner pipe 31 and the bore outer pipe 32, and the cylindrical space is circumferentially blocked, i.e., partitioned, by an annular connecting part 33 at a substantially longitudinally central section thereof. For instance, the substantially longitudinally central section of the cylindrical space is a section along with a circumferential direction of the throttle valve 1 in the full close position. Namely, the substantially longitudinally central section is a circumferential section of the bore wall part 21 passing through the axial center of the throttle shaft. The annular connecting part 33 connects the outer periphery of the bore inner pipe 31 and the inner periphery of the bore outer pipe 32, such that the annular connecting part 33 blocks substantially entirely over the circumferential area of the cylindrical space formed between the bore inner pipe 31 and the bore outer pipe 32.

The cylindrical space between the bore inner pipe 31 and the bore outer pipe 32 located on the axially upstream side with respect to the annular connecting part 33 serves as a blockade recess part (moisture trapping groove) 34 for blocking moisture flowing along with the inner periphery of the intake pipe toward the intake manifold. The cylindrical space between the bore inner pipe 31 and the bore outer pipe 32 located on the axially downstream side with respect to the annular connecting part 33 serves as a blockade recess part (moisture trapping groove) 35 for blocking moisture flowing along with the inner periphery of the intake manifold.

The motor housing part 23, which receives the driving motor 1, is integrally molded of the resinous material with the bore wall part 21 via connecting portion 24 to construct the throttle body 2. The motor housing part 23 is arranged in parallel with the bore wall part 21. That is, the motor housing part 23 is in parallel with the bore wall part 21 with respect to the gearbox part 22 in the throttle body 2. The motor housing part 23 is arranged on the radially outer side of the bore outer pipe 32. The motor housing part 23 is integrally molded of the resinous material with the gearbox part 7. Specifically, the motor housing part 23 is integrally molded with the end face of the gearbox part 22 located on the left side in FIG. 1. The gearbox part 22 has a chamber for rotatably receiving the reduction gears. The motor housing part 23 has a substantially cylindrical sidewall part 25 and a substantially circular shaped bottom wall part 26. The sidewall part 25 extends from the left side face of the gearbox part 22 in the left direction in FIG. 1. The bottom wall part 26 plugs the opening side of the sidewall part 41 on the left side in FIG. 1. The central axis of the sidewall part 25 of the motor housing part 23 is arranged substantially in parallel with the axis of the metal shaft 5, i.e., rotation axis of the throttle valve 3. Besides, the central axis of the sidewall part 25 of the motor housing part 23 is arranged substantially perpendicularly to the central axis of the bore inner pipe 31 of the bore wall part 21.

The bore outer pipe 32 has a stay 27 at the opening end thereof. The stay 27 is a ring shaped portion which is integrally formed and is radially extending from the bore outer pipe 32a. The stay 27 is for fixing the throttle apparatus on the intake manifold and has a plurality of through hole 27a through which bolts are inserted. The stay 27 has an undercut portion 29 which communicates with some of the through hole 27a.

Referring to FIG. 1, the bore inner pipe 31 and the bore outer pipe 32 has the substantially cylindrical first valve bearing 41 and the substantially cylindrical second valve bearing 42 that are integrally molded of a resinous material. The first valve bearing 41 rotatably supports the first bearing sliding part of the metal shaft 5. The second valve bearing rotatably supports the second bearing sliding part of the metal shaft 5. A circular-shaped first shaft hole 41a is formed in the first valve bearing 41, and a circular-shaped second shaft hole 42a is formed in the second valve bearing 42. A plug (not shown) is provided on the first valve bearing 41 for plugging the opening side of the first valve bearing 41. The second valve bearing 42 is integrally molded with the bore wall part 21, i.e., bottom wall of the gearbox part 22 of the throttle body 2, to be protruded in the right direction in FIG. 2. The outer periphery of the second valve bearing 42 serves as a spring inner periphery guide (not shown) for supporting the diametrically inner periphery of the coil spring 4.

The throttle body 2 includes a first body joint 43. The first body joint 43 is insert-molded in the throttle body 2 at a vicinity of the first valve bearing 41 of the bore wall 21, that is, at a vicinity of a first shaft hole 41a of the bore inner pipe 31. The first body joint 43 has a first groove 43a which is opened in parallel to a radial direction of the boar wall 21. A second body joint 44 is insert-molded in the throttle body 2 at the second valve bearing 42. The second body joint 44 has the same shape as the first body joint 43. The first and the second body joints 43, 44 are made of a material which is not melt and mixed to the resin material of the throttle valve 3 and the throttle body 2, or a material which has no adhesiveness, such as brass, oil-less metal and cupper.

The first and the second body joints 43, 44 have a first flat seal surfaces 43b, 44b in order to seal between the inner surface of the bore inner pipe 31 and an axial end surface of the throttle valve 3 when the throttle valve 3 is fully closed. The first and the second body joints 43, 44 have a first and a second shaft hole 43c, 44c for supporting a first and a second ends of the metal shaft 5. When the throttle valve 3 is fully closed, the first and the second flat seal surfaces 43b, 44b confront a first and a second flat surface 54, 55 in a predetermined clearance.

The first and the second shaft hole 43c, 44c are opened at positions which confront the annular connecting part 33. The first and the second shaft holes 43c, 44c communicate the upstream of the first and the second groove 43a, 44a, with the downstream thereof. The first and the second shaft holes 43c, 44c have the same diameter as the first and the second shaft hole 41a, 42a, and are formed coaxially with respect to the first and the second shaft hole 41a, 42a.

The coil spring 4 is provided on the outer peripheral side of the metal shaft 5. One end part of the coil spring 4 is supported by a body side hook (not shown) provided on the outer wall of the bore wall part 21, i.e., bottom wall of the gearbox part 22. The other end part of the coil spring 4 is supported by a gear side hook (not shown) provided on a plane of the valve gear 8 that is located on the side of the bore wall part 21.

The throttle valve 3 is a butterfly valve of which axis is substantially orthogonal to the center axis of the bore wall part 21. The opening position of the throttle valve is varied from a full-opening position to a full-closing position to control the air amount which is introduced into the engine. The throttle valve 3 is comprised of a first semicircle plate 51, a second semicircle plate 52, a cylindrical resin shaft 53, and the metal shaft 5. The first and the second semicircle plates 51, 52 are made of a thermoplastic synthetic resin, such as PPS, PA, PP, and PEI. When the first and the second semicircle plates 51, 52 are fixed on the cylindrical resin shaft 53, the first and the second semicircle plates 51, 52 form a resin disc.

When the throttle valve 3 is in the full-opening position, the first semicircle plate 51 is positioned upper side of the bore wall part 21 and the second semicircle plate 52 is positioned lower side of the bore wall part 21 with respect to the resin shaft 53. The first and the second semicircle plate 52 are provided with stiffening ribs on the one side or both sides thereof. The resin shaft 53 is integrally molded with the metal shaft 5, by which the throttle valve 3 and the metal shaft 5 are integrated to rotate together.

The metal shaft 5 is a throttle shaft made of a metallic material such as brass or stainless steel to be in a round-bar shape. The axis of the metal shaft 5 is arranged to being direction substantially perpendicular to a central axis of the bore wall part 21 of the throttle body 2, and is arranged to be in a direction substantially parallel to the central axis of a motor housing part 23. In this embodiment, the metal shaft 5 has a valve supporting portion for supporting the resinous shaft 53. The metallic valve supporting portion is insert molded inside of the resin shaft part 53 to reinforce the first and the second semicircle plates 51, 52 and the resin shaft 53.

Figure 2:
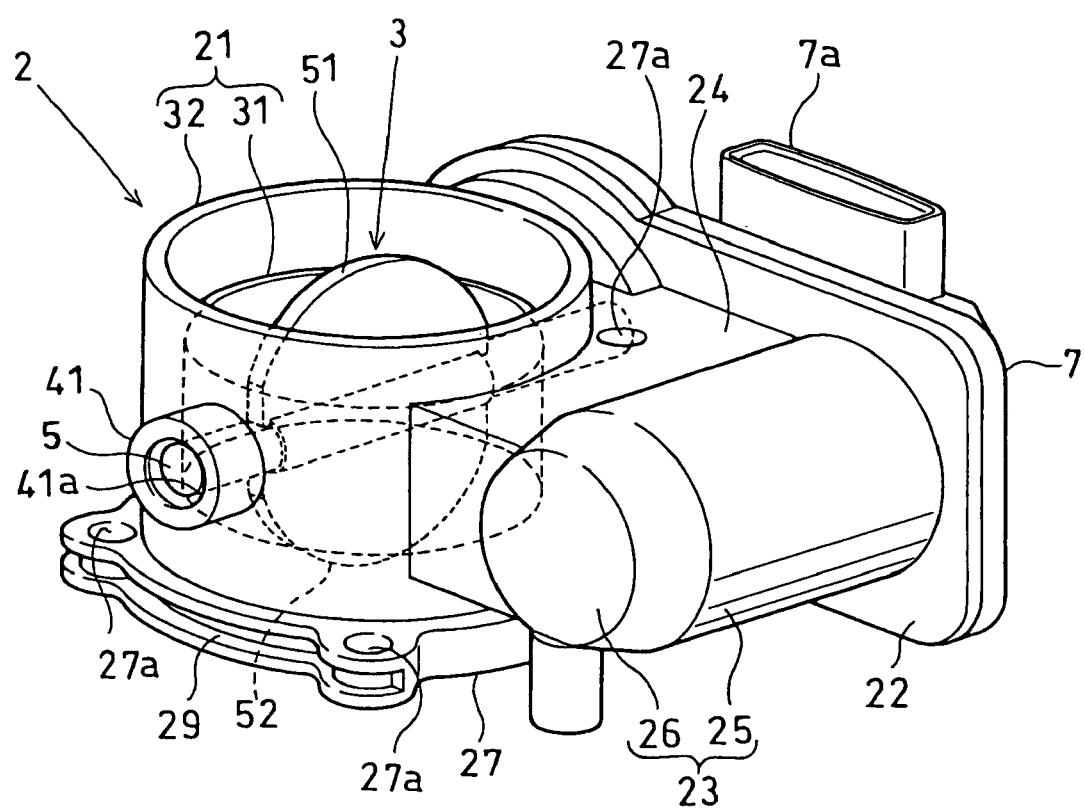
FIG. 2 is a perspective view of a throttle apparatus according to the first embodiment.
Figure 3:
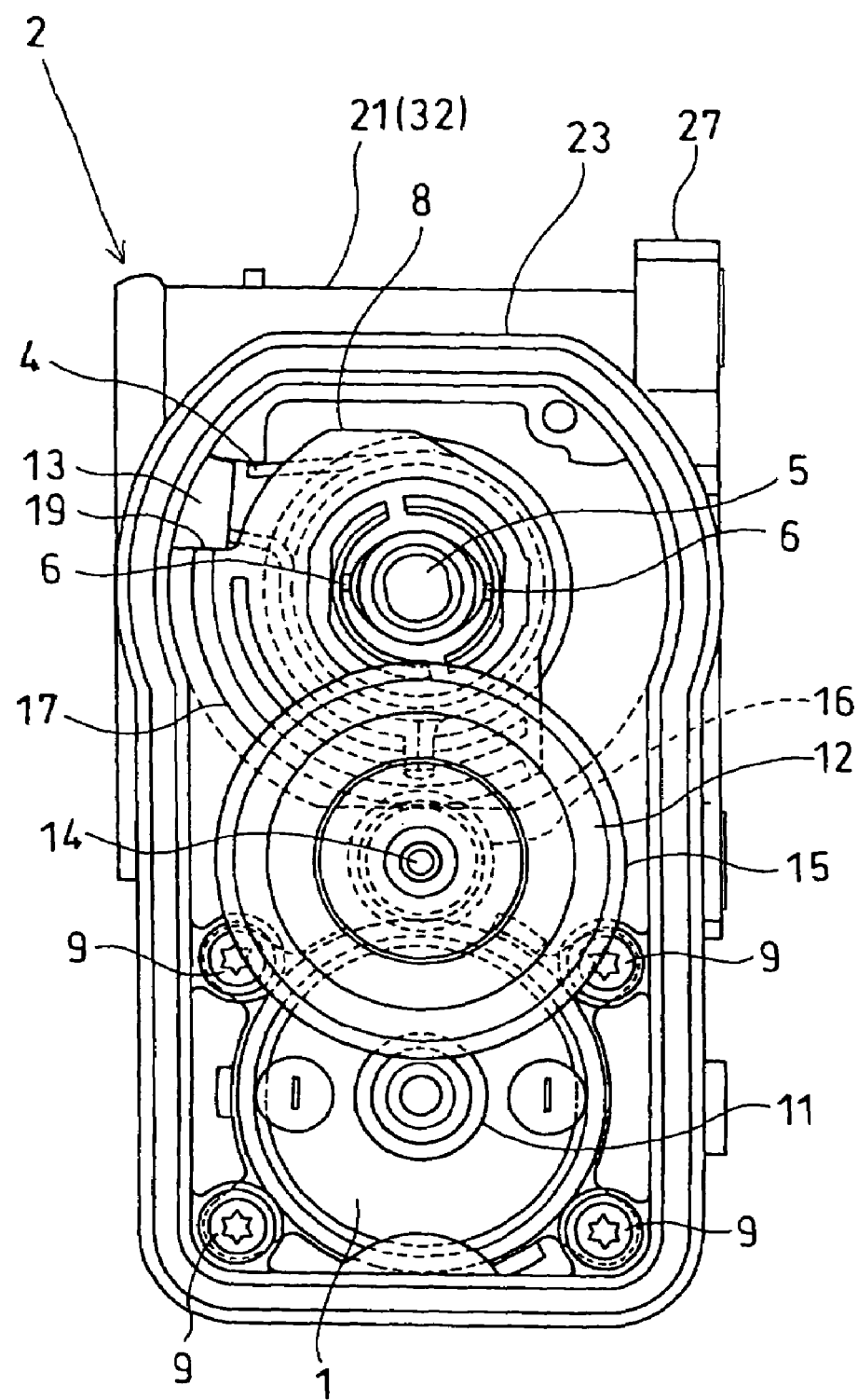
FIG. 3 is a front view showing an inside of a gearbox according to the first embodiment.
Figure 4:
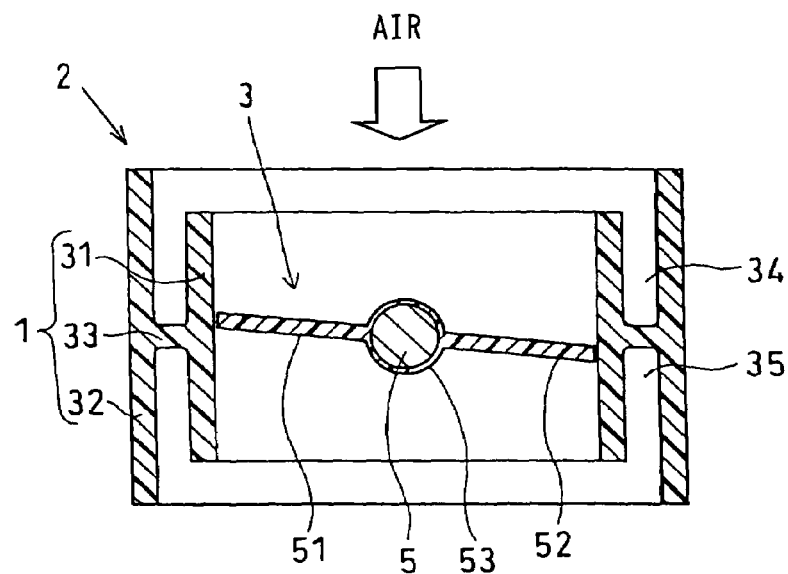
FIG. 4 is a cross sectional view of a double-piped bore wall according to the first embodiment.
Figure 5A:
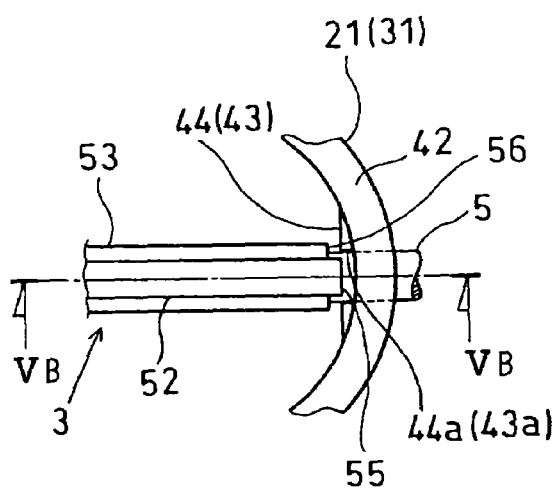
FIG. 5A is a partial view showing an arrangement of the throttle valve and the throttle body according to the first embodiment.
Figure 5B:
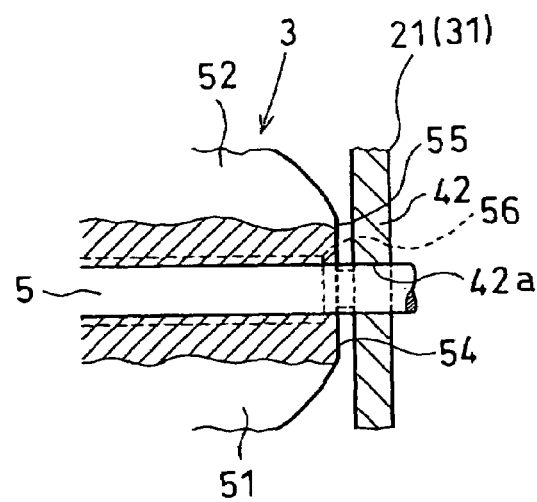
FIG. 5B is a cross sectional view along the line A—A of FIG. 5A.

One end portion of the metal shaft 5 on the left side end in FIG. 2 exposes (protrudes) from one end face of the resin shaft 53 in order to serve as a first bearing sliding part that rotatably slides in the first valve bearing 41. The other end side of the throttle shaft on the right side end in FIG. 2 exposes (protrudes) from the other end face of the resin shaft 53 in order to serve as a second bearing sliding part that rotatably slides in a second valve bearing (not shown) of the bore wall part 21. The valve gear 8 constructing the reduction gears is integrally provided on the other end portion of the metal shaft 5 on the right side end in FIG. 2.

The throttle valve 2 has the first flat surface 54 and the second flat surface 55 at the axial ends of the first semicircle plate 51 and the second semicircle plate 52. The first flat surface 54 and the second flat surface 55 extend in the axial direction of the boar wall 21. The throttle valve 2 has arc end surfaces 56 at both end of the resin shaft 53. A predetermined distance is made between the first and the second flat surface 55, 56 and the arc end surfaces 56. Thereby, a thin die is needed for a certain restricted area where is between the inner surface of the bore inner pipe 31 and the axial ends of the throttle valve 3 only the certain restricted area needs the thin die and the remaining other potions of the throttle valve 2 and the throttle body 2 need a normal thick die.

Figure 6A:
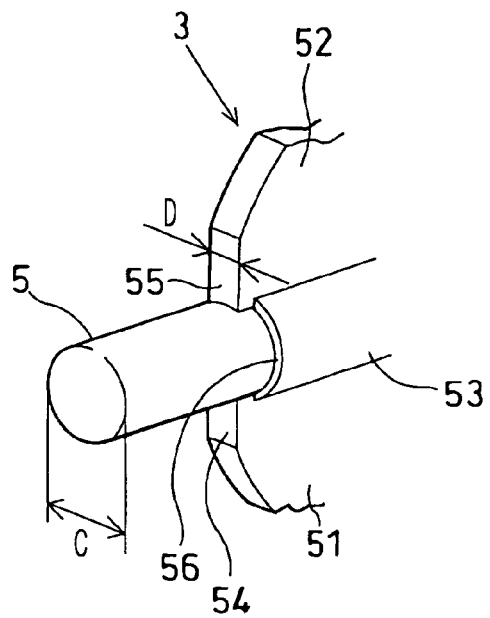
FIG. 6A is a partial view of an axial side of a throttle valve.
Figure 6B:
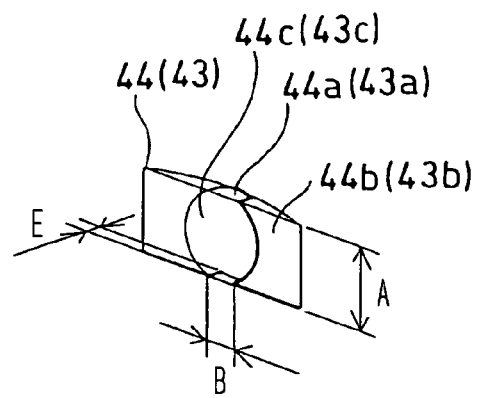
FIG. 6B is a perspective view of body joint.
Figure 7:
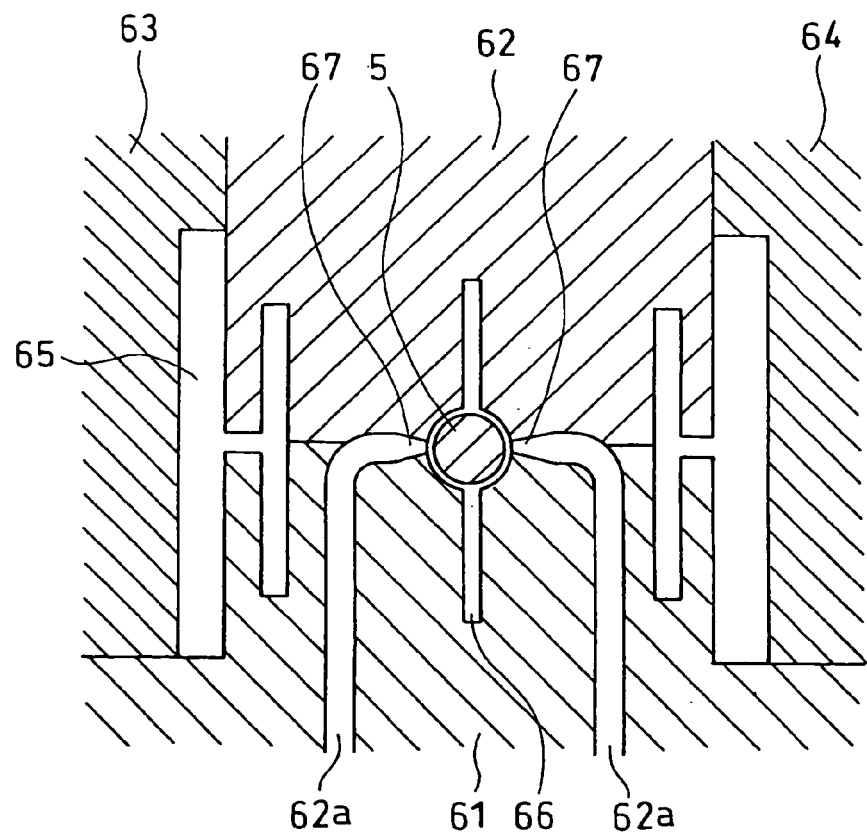
FIG. 7 is a cross sectional view of the molding dies according to the first embodiment.
Figure 8:
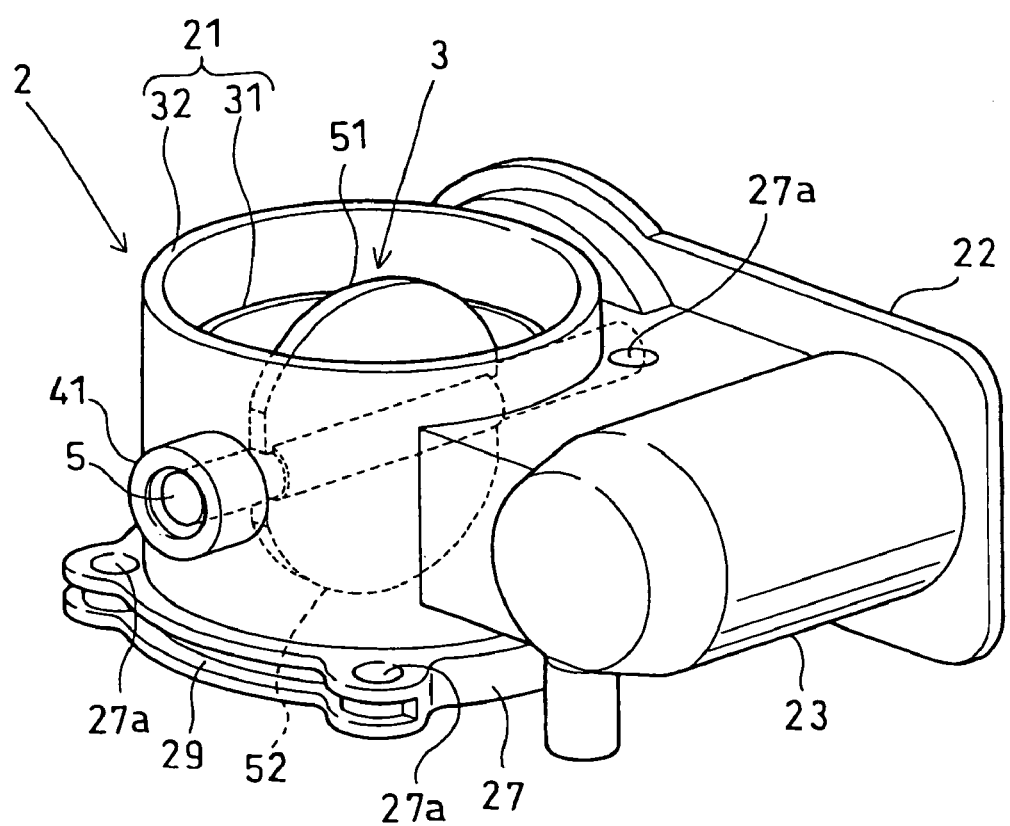
FIG. 8 is a perspective view of a throttle apparatus according to the first embodiment.

Referring to FIGS. 1 to 8, the forming method of the throttle apparatus is described hereinafter. FIG. 7 schematically shows molding dies and FIG. 8 shows a molded product of the throttle apparatus.

As shown in FIG. 7, the molding dies include a fixed die 61 and a movable die 62 which can move forward and backward relative to the fixed die 61. In FIG. 7, the movable die 62 moves up and down relative to the fixed die 61. A parting line of the dies 61, 62 is positioned on the axis of the throttle valve 3 in order to form the inner surface of the bore inner pipe 31 and the throttle valve 3. The movable die 62 includes slide cores 63, 64 which can slide transversely in FIG. 7, and includes a slide core (not shown) in order to form the undercut portion 29.

When the molding dies are clamped, the fixed die 61, the movable die 62, and slide cores 63, 64 form a body cavity 65 and a valve cavity 66. The body cavity 65 corresponds to the shape of the bore wall part 21 which is double cylindrical. The valve cavity 66 corresponds to the shape of the first and the second semi-circle plates 51, 52 and the resin shaft 53. The body cavity 65 includes a first body cavity 65, a second body cavity (not shown), and a third body cavity (not shown). The first body cavity 65 corresponds to the shape of the bore wall 21 of the throttle body 2. The second body cavity corresponds to the shape of the gearbox part 22. The third body cavity corresponds to the shape of the motor housing 23 and the connecting portion 24. The valve cavity includes a first valve cavity to form the first semicircle plate 51, and a second valve cavity to form the second semicircle plate 52.

The metal shaft 5 functions as a first and a second supported portions which are supported by the first bearing 41 and the second bearing 42. The bore wall 21 functions as a valve holding portion which holds the resin shaft 53 of the throttle valve 3. When the throttle body 2 and the throttle valve 3 is substantially simultaneously molded in the same die, the first and the second shaft holding portions (not shown) hold the both ends of the metal shaft 5, the first and the second shaft holding portion being provided in the fixed die 61 and the movable die 62. Thus, the metal shaft 5 is inset-molded in the resin shaft 53. The first and the second joints 43, 44 are also held by the first and the second shaft holding portions in such a manner that the first and the second joints 43, 44 are insert-molded at the vicinity of the first and the second shaft hole 41a, 42a.

The first body cavity 65 to the third body cavity are communicated with each other. The valve cavity 66 is isolated from the first to the third body cavity 65 by a fixed die 61 and the movable die 62.

The first to the third body cavity 65 and the valve cavity 66 are connected with a resin material supplying apparatus (not shown). The resin material supplying apparatus includes single or multiple body gates at ends of a resin passage 62a through which a melted resin such as PPS and PBT is injected into the body cavity 65. The resin material supplying apparatus includes a pair of valve gates 67 at ends of the resin passage 62a through which a melted resin such as PPS and PBT is injected into the valve cavity 66.

Single or multiple body gates can be positioned at the bore wall 21 or the motor housing 23. As shown in FIG. 7, each of the valve gates 67 is confronting each other from opposite direction with respect to the resin shaft 53 and the metal shaft 5. Thus, melted resin can easily flow into the whole of valve cavity 66.

In order to form the throttle valve 3 and the throttle body 2 simultaneously in the same die, the body cavity 65 and the valve cavity 66 are formed in such a manner that the molded throttle valve 3 is positioned in the full-opening position as shown in FIG. 8.

The movable die 62 is moved toward the fixed die 61 to be clamped each other. The body cavity 65 and the valve cavity 66 are formed between the movable die 62 and the fixed die 51. The melted resin, such as PPS and PBT, is injected into the body cavity 65 and the valve cavity 66 through the body gate and the valve gate 67. The first and the second shaft holding portion provided in the dies hold the metal shaft 5 in such a manner that the both ends of the metal shaft 5 is positioned in the body cavity 65 and the valve cavity 66. The first and the second joint holding portions hold the first and the second joints 43 44 in the body cavity 65. Two arrows in FIG. 1 show a flow direction of the melted resin from the valve gates 67 into the valve cavity 66.

The inner pressures of the cavities 65, 66 are gradually increased, and the holding pressure which is higher than the maximum pressure of the injection pressure is maintained in the cavities 65, 66 in a predetermined period.

The injected resin in the cavities is cooled by a cooling water to be solidified. The cooling water circulates in the dies. After the resin in the dies is solidified in such manner that the throttle valve 3 can rotate in the throttle body 2, the resin molding shown in FIG. 8 is ejected from the dies. The metal shaft 5 is insert-molded in the resin shaft 53, and the first and the second body joints are also insert-molded in the bore inner pipe 31.

As follows, an operation of the electrically controlled throttle apparatus is described. When the driver steps the accelerator pedal of the vehicle, the accelerator position signal, which is transmitted from the accelerator position sensor to the ECU, changes. The ECU controls electric power supplied to the driving motor 1, so that the motor shaft of the driving motor 1 is rotated and the throttle valve 1 is operated to be in a predetermined position. The torque of the driving motor 1 is transmitted to the valve gear 8 via the pinion gear 11 and the middle reduction gear 12. Thus, the valve gear 8 rotates by a rotation angle corresponding to the stepping degree of the accelerator pedal, against urging force generated by the coil spring 4.

Therefore, the valve gear 8 rotates, and the metal shaft 5 also rotates by the same angle as the rotation angle of the valve gear 8, so that the throttle valve 3 rotates from its full close position toward its full open position. As a result, the air intake passage formed in the bore inner pipe 31 of the bore wall part 21 of the throttle body 2 is opened by a predetermined degree, so that rotation speed of the engine is changed to be a rotation speed corresponding to the stepping degree of the accelerator pedal by the driver.

When the driver releases the accelerator pedal, the throttle valve 3, the metal shaft 5, and the valve gear 8 return to an initial position of the throttle valve 3 by urging force of the coil spring 4. The initial position of the throttle valve 3 is an idling position or the full close position. When the driver releases the accelerator pedal, the value of the accelerator position signal transmitted by the accelerator position sensor becomes substantially 0%. Therefore, in this situation, the ECU can supply electric power to the driving motor 1 in order to rotate the motor shaft of the driving motor 1 in its reverse direction, so that the throttle valve 3 is controlled at its full close position. In this case, the throttle valve 3 can be rotated in the close direction by the driving motor 1. The throttle valve 3 rotates in the close direction by urging force of the coil spring 4 until the full-close stopper portion 19 provided on the valve gear 8 contacts the full-close stopper 13 integrally molded on the inner wall of the gearbox part 22 of the throttle body 2. Here, the close direction is a direction, in which the throttle valve 3 closes the air intake passage by rotating from the full open position to the full close position. Rotation of the throttle valve 3 is restricted by the full-close stopper 19 at the full close position of the throttle valve 3. Therefore, the throttle valve 3 is maintained in the predetermined full close position, i.e., idling position, in the air intake passage formed in the bore inner pipe 31. Thus, the air intake passage connected to the engine is substantially closed, so that rotation speed of the engine is set at a predetermined idling speed.

In the present embodiment, the throttle body 2 and the throttle valve 3 is integrally molded of the resin in such a manner that the throttle valve 3 is in full opened position in order that the throttle valve 3 can rotate in the bore inner pipe 31.

Figure 11:
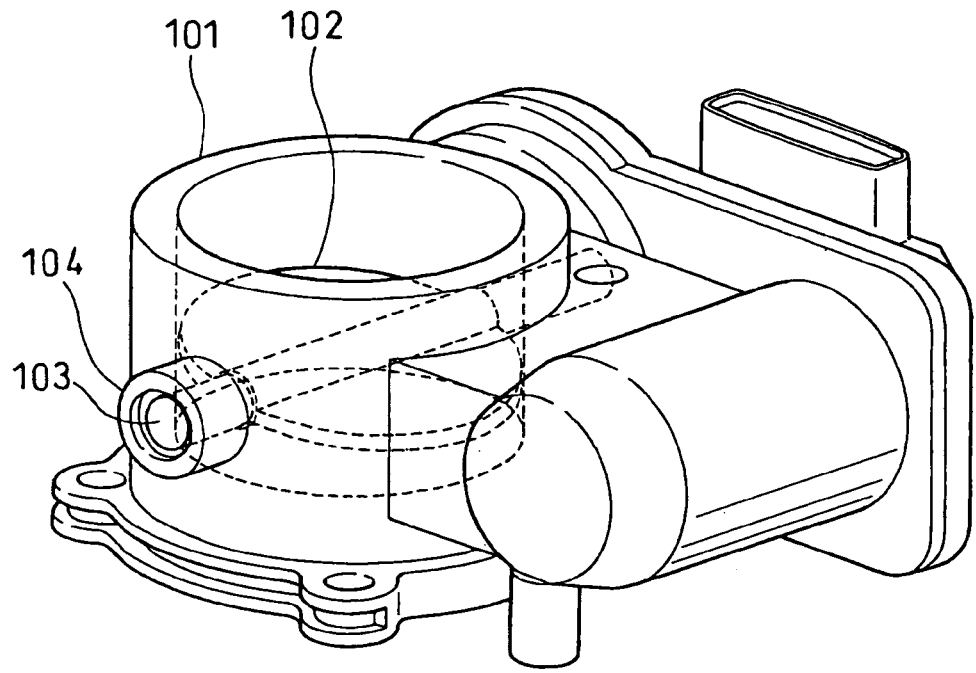
FIG. 11 is a perspective view of a conventional throttle body.
Figure 12:
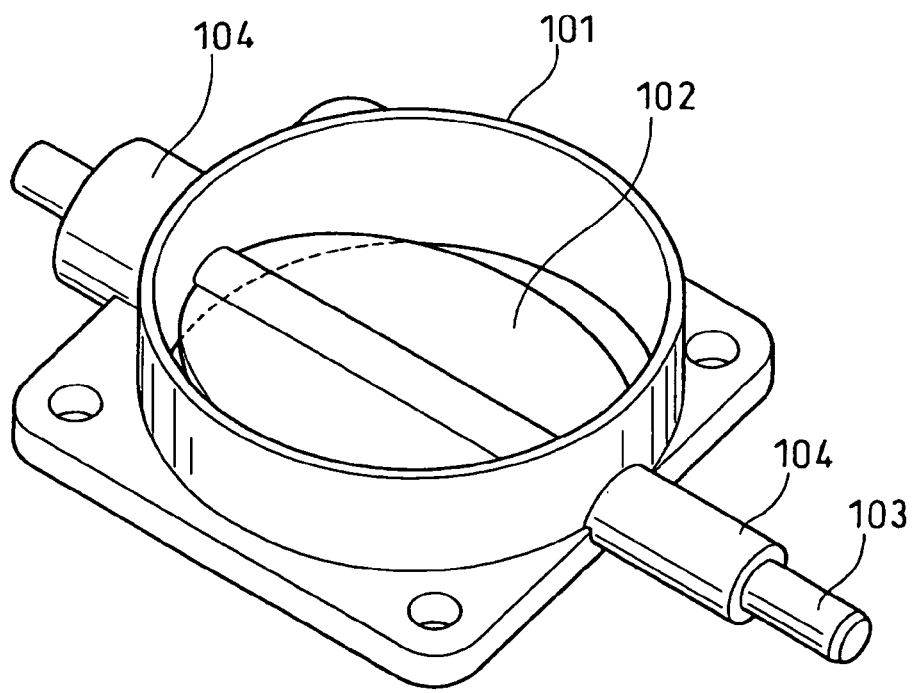
FIG. 12 is a perspective view of a conventional throttle apparatus.
Figure 13:
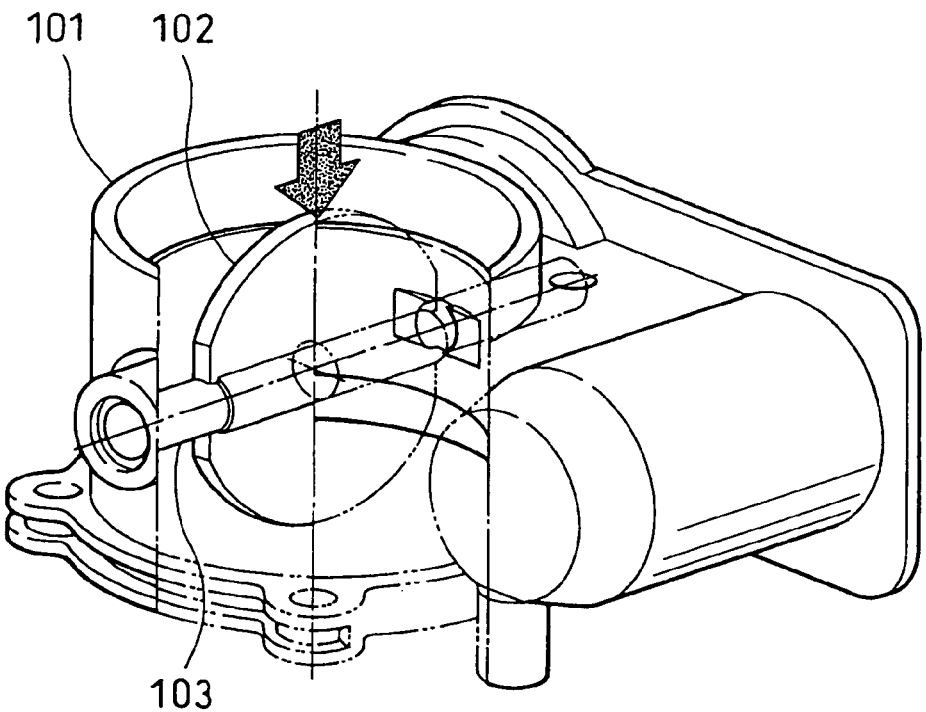
FIG. 13 is a perspective view for explaining a comparative method.
Figure 14A:
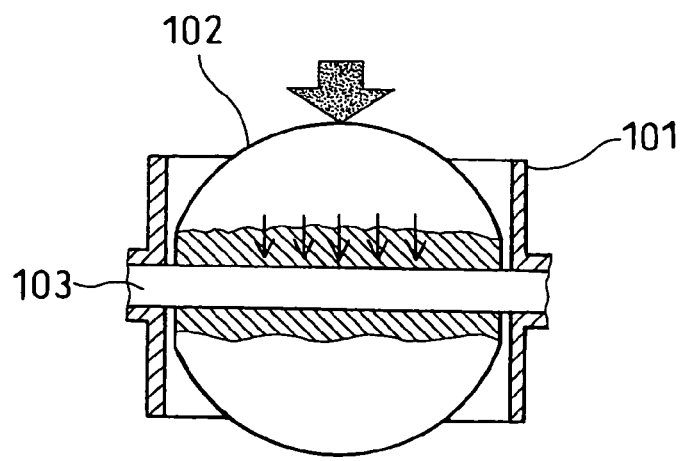
FIGS. 14A and 14B are cross sectional view for explaining a conventional molding method.
Figure 14B:
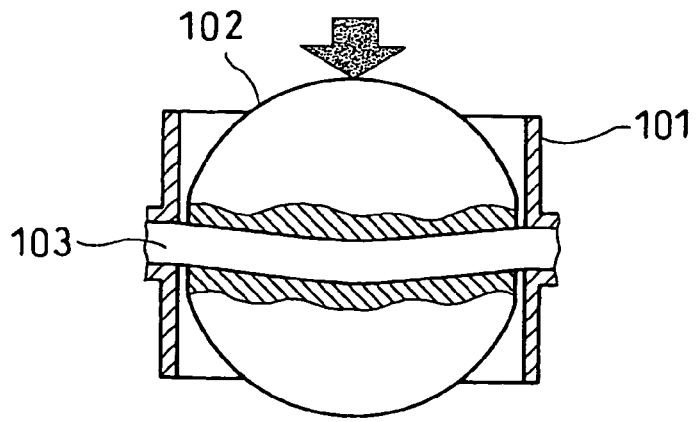
Figure 15:
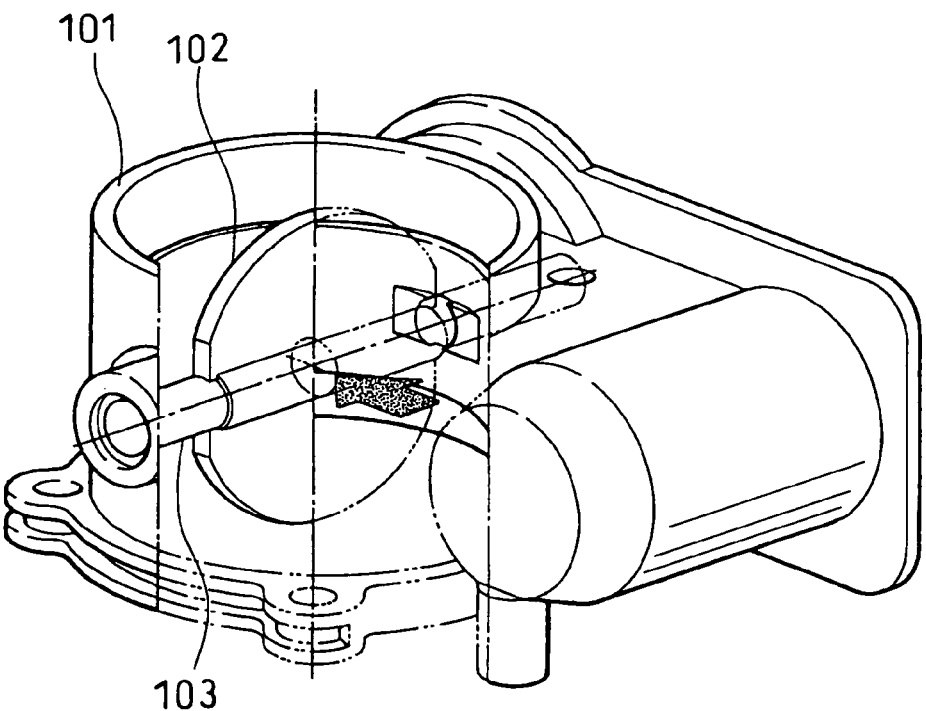
FIG. 15 is a perspective view of the throttle apparatus for explaining a comparative molding method.
Figure 16A:
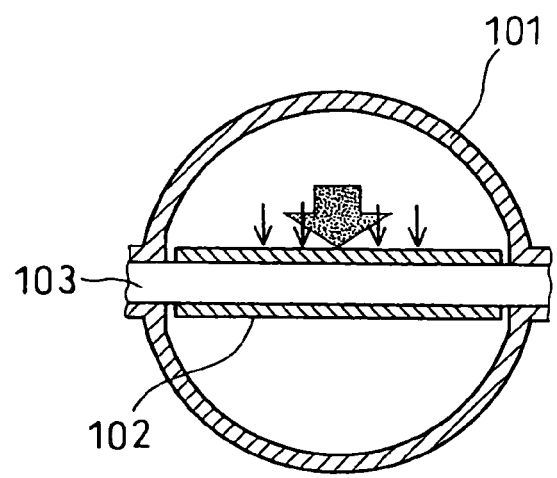
FIGS. 16A and 16B are cross sectional views for explaining a comparative molding method.
Figure 16B:
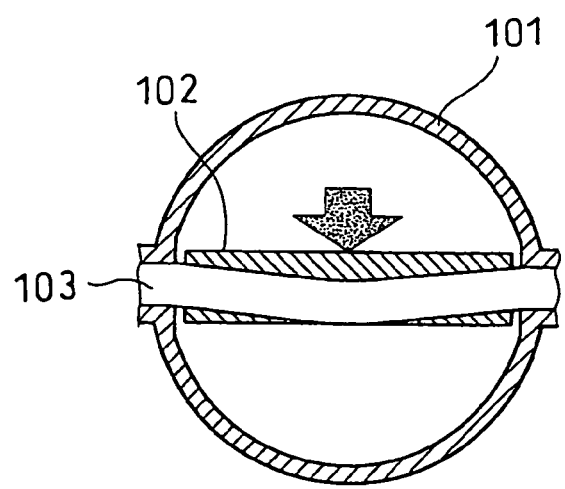

In the conventional molding dies for forming the throttle apparatus shown in FIG. 11, a thin cylindrical die is needed to form a gap between the throttle body. 101 and the throttle valve 102, so that the cost of the dies and production cost are increased. However, in the present embodiment, the molding dies are needed to form the inner surface of the bore inner pipe 31 and both ends of the axis of the throttle valve 3. In other words, the inner surface of the bore inner pipe 31 at the vicinity of the first and the second bearings 41 is isolated from both ends of the axis of the throttle valve 2 by the first and the second shaft holding portion of the fixed die 61 and the movable die 62, and both ends of the metal shaft 5.

Therefore, the throttle valve 3 and the throttle body 2 are molded as shown in FIG. 8 at the same time in the same dies without increasing production cost.

Furthermore, the inner surface of the bore inner pipe 31 and the both ends of metal shaft 5 are isolated from each other. The body cavity 65 and the valve cavity 66 are isolated enough to maintain the gap between the inner surface of the bore inner pipe 31 and the outer surface of the throttle valve 3 in a proper value, by which the product function is not deteriorated. That is, the throttle valve 3 can rotate in the bore inner pipe 31 without any interference there between. The throttle valve 3 and the metal shaft 5 are hardly stuck. When the throttle valve 3 is fully closed, the air tightness of the throttle valve 3 is not deteriorated.

The first and the second body joints 43, 44 have the first and the second grooves 43a, 44a which are contact with the first and the second flat surfaces 54, 55 respectively. Thus, the first and the second shaft holding portions of the fixed die 61 and the movable die 62 can be disposed between the inner surface of the bore inner pipe 31 and the first and the second flat surfaces 54, 55. Thereby, the durability of the molding dies is enhanced.

In order that the throttle valve 3 and the bore wall 21 are integrally molded, the first and the second flat surfaces 54, 55 are not contact with the inner surface of the bore inner pipe 31. An amount of the clearance between the inner surface of the bore inner pipe 31 and the first and the second flat surfaces 54, 55 is adjustable by means of the first and the second shaft holding portions.

As shown in FIGS. 6A and 6B, the diameter of the first and the second shaft hole 43c, 44c is denoted by "A", the width of the first and the second groove 43a, 44a is denoted by "B", the diameter of the metal shaft 5 is denoted by "C", the width of the first and the second surface 54, 55 is denoted by "D", and the depth of the first and the second grooves is denoted by "E".

$$A \leq C \quad (1)$$

$$D \leq B \quad (2)$$

$$0 \leq E \quad (3)$$

When the dimension "A" to "E" satisfy the above formula, the inner surface of the bore inner pipe 31 and the first and the second flat surfaces 55, 56 of the throttle valve 3 are isolated from each other by the first and the second shaft holding portion. Therefore, the throttle body 2 and throttle valve 3 can be simultaneously molded in the same die, and the amount of the clearance between the inner surface of the bore inner pipe 31 and the first and the second flat surfaces 54, 55 can be adjustable.

Since the melted resin is injected into the valve cavity 66 through a pair of valve gates 67 which are symmetrically disposed with respect to the resin shaft 53 and the metal shaft 5, the deformation of the resin shaft 53 and the metal shaft 5 can be avoided even if the melted resin is injected under a predetermined high pressures. The circularity of the throttle valve 3 is also enhanced. Thus, the throttle valve 3 can rotate in the throttle body 2 smoothly without any interference therebetween. Furthermore, the velocity of flow of the melted resin into the valve cavity 66 is increased so that the valve cavity 66 is filled with the melted resin in a short period.

The deformation of the resin shaft 53 and the metal shaft 5 is restricted, and the circularity of throttle valve 3 is enhanced. Thereby, when the throttle valve 3 is positioned in the full closed position, the clearance between the outer surface of the throttle valve and the inner surface of the throttle body is minimize to obtain the hermeticity. When the engine is at idling, the leak amount of the intake air is reduced to enhance the fuel economy.

The number of the defective throttle valve 3 is reduced, so that the high quality throttle apparatus shown in FIG. 8 can be produced constantly. The accuracy of the clearance between the throttle valve 3 and the throttle body 2 is enhanced.

Since a pair of the valve gates 67 is symmetrically disposed with respect to the resin shaft 53, a cooling time deference between both sides of the throttle valve 3 is reduced.

The throttle valve 3 can be made of a thermoplastic resin including filling materials, such as PBTG30 (polybutylene terephthalate including grass fiber by 30%). In this case, the first and the second semi-circle plates 51, 52 hardly warp and shrink, so that the circularity of the throttle valve 2 comprising the first and the second semi-circle plate 51, 52 is enhanced.

(Second Embodiment)

Figure 9:
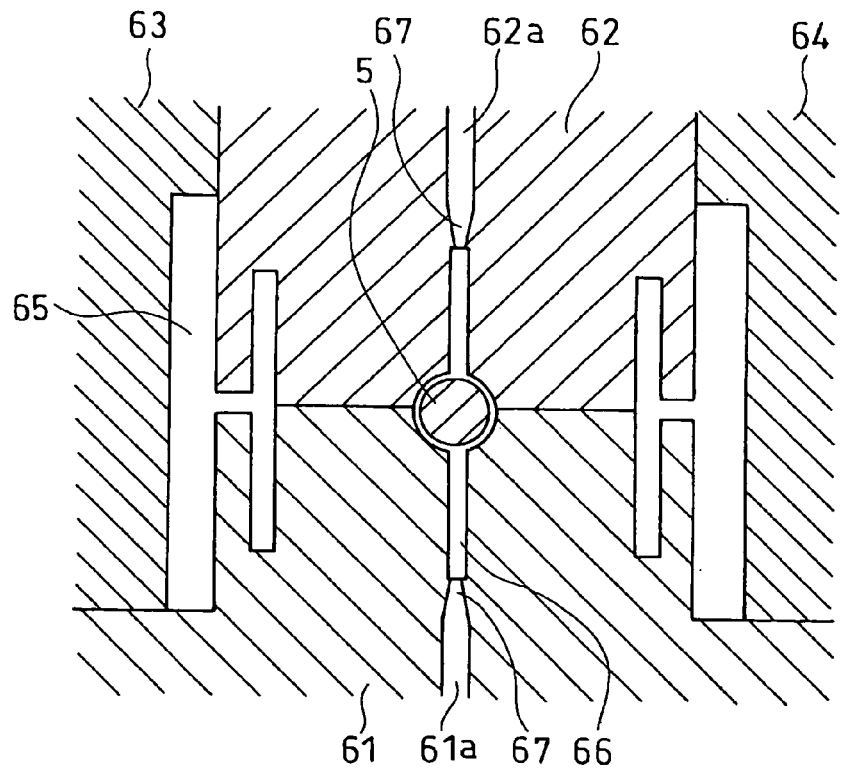
FIG. 9 is a cross sectional view of the molding dies according to the second embodiment.

FIG. 9 shows molding dies according to a second embodiment of the present invention. A pair of the valve gates 67 is positioned at outer ends of the valve cavity 66. Each of the valve gates 67 confronts each other from opposite directions. The valve gates 67 are connected with resin passages 61a, 62a. The resin passage 61a is defined in the fixed die 61 and the resin passage 62a is defined in the movable die 62.

Since the melted resin is injected into the valve cavity 66 through the gates 67 which are opposed to each other, the circularity of the throttle valve 3 comprising the first and the second semi-circle plates 41, 52 is enhanced and the cooling period difference between the both sides of the first and the second semi-circle plate 51, 52 is reduced.

(Third Embodiment)

Figure 10A:
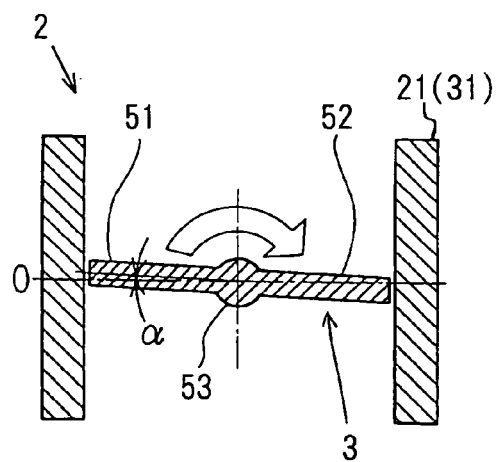
FIGS. 10A and 10B are cross sectional views for explaining a molding method.
Figure 10B:
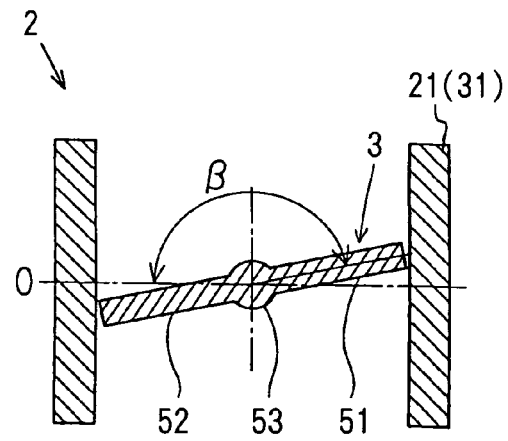

As shown in FIGS. 10A and 10B, the throttle valve 3 is molded of a resinous material in the same molding dies as that of the throttle body 2. In this situation, a rotation angle (valve forming angle θ) of the throttle valve 3 is set between a rotation angle α ($\geq 0°$) corresponding to the full close position of the throttle valve 3 and a rotation angle β ($\leq 180°$) corresponding to a position of the throttle valve 3, in which the throttle valve 1 contacts the throttle body 2. The relation among α, β and θ is shown by the following equation (4).

$$\alpha < \theta < \beta \quad (4)$$

(Modification)

In the aforementioned embodiment, the throttle valve 3 is rotated by the driving motor 1. The present invention can be applied to a mechanical throttle apparatus in which the accelerator pedal is mechanically connected to the throttle valve 3 through a wire cable.

The valve holding part of the metal shaft 5 has a knurled portion in order to firmly connect the metal shaft 5 to the throttle valve 3. The metal shaft 5 and the resin shaft 53 can have width across flats to restrict relative rotation there between.

Before molding, mold release agent or lubricant, such as fluorine resin and molybdenum disulfide can be applied to both ends of the metal shaft 5.

In the aforementioned embodiment, the bore inner pipe 31 and the bore outer pipe 32 have the same center axis. The center axes of bore pipes 31, 32 can be offset to each other.

The bore wall 21 can be single pipe construction.

The aforementioned embodiment includes a blockade recess parts (moisture trapping groove) 34, 35 for blocking moisture. Only blockade recess part 34 can be provided.

The throttle apparatus can include a bypass passage which bypasses the throttle valve 3, and further include an idle speed control valve in the bypass passage to control the amount of the air introduced into the engine. An outlet of a positive crankcase ventilation (PCV) device or a purge tube can be connected to the intake manifold upstream of the bore wall 21. In such an arrangement, the blockade recess part 34 blocks the oil mist and the deposit to restrict a defective operation of the throttle valve 3 and the metal shaft 5.

In the above embodiments, the molding dies include a pair of valve gates 67. More than two valve gates can be provided in the molding dies. Four valve gates can be provided every 90° angle around the resin shaft 53. Six valve gates can be provided every 60° angle around the resin shaft 53. Eight valve gates can be provided every 45° angle around the resin shaft 53. Twelve valve gates can be provided every 30° angle around the resin shaft 53. Multiple valve gates can be provided in a radial direction of the resin shaft 53.

The axis of the throttle valve 3 is of material which is not melt and mixed to the resin material of the throttle valve 3 and the throttle body 2, such as ceramics. A resin shaft can be used instead of the metal shaft 5. The bore wall 21, the gearbox part 22, the motor housing 23, the first and the second semi-circle plates 51, 52 and the resin shaft 53 can be made of a composite material, such as PBTG30 (polybutylene terephthalate including grass fiber by 30%).

The throttle apparatus can be made of aluminum alloy or magnesium alloy.

What is claimed is:

1. A forming method of a throttle apparatus for an internal combustion engine, the throttle apparatus including a substantially tubular throttle body and a substantially disc-shaped throttle valve, the throttle valve having an axis around which the throttle valve rotates in the tubular throttle body between a closed position and an open position, the throttle valve and the throttle body being molded substantially simultaneously in same molding dies in such a manner that the throttle valve is rotated by a predetermined angle with respect to a full closed position in which the throttle valve and the throttle body define a minimum gap therebetween, the forming method of the throttle apparatus, comprising:

clamping a pair of molding dies to form a body cavity and a valve cavity therein, the body cavity being for molding a throttle body and the valve cavity being for molding a throttle valve in such a manner that the throttle valve is rotated by a predetermined angle with respect to a full closed position, in which the throttle valve and the throttle body define a minimum gap therebetween; so that the throttle valve is not in contact with an inner bore surface of the throttle body;

substantially simultaneously injecting a melted material into the body cavity and the valve cavity;

moving one of said dies away from the other of said dies; and protruding an ejector into the cavities in order to eject a solidified molding, wherein the melted material is injected into the valve cavity through a plurality of valve gates each of which are symmetrically located about said axis.

2. The forming method of a throttle apparatus according to claim 1, wherein the throttle valve is molded in a position in which the throttle valve is full opened position.

3. The forming method of a throttle apparatus according to claim 1, wherein the valve gates are located at a position which confronts to outer ends of the throttle valve.

4. The forming method of a throttle apparatus according to claim 1, wherein the melted material is one of a melted resin and a melted metal.

5. The forming method of a throttle apparatus according to claim 1, wherein the throttle valve is made of a resin composite material containing a filler, and the axis of the throttle valve is made of metallic material.

6. The forming method of a throttle apparatus according to claim 1, wherein a pair of valve gates are symmetrically located with respect to the axis of the throttle valve.

7. The forming method of a throttle apparatus according to claim 6, wherein a pair of valve gates are located at a position in which the axis of the throttle valve is orthogonal to a center axis of the throttle body.

* * * * *